Nov. 25, 1958  E. W. MOORMAN  2,861,707
SUSPENSION FOR FLEXIBLE CLOSURE
Filed June 27, 1955

INVENTOR.
EDWARD W. MOORMAN
BY
ATTORNEY

United States Patent Office 2,861,707
Patented Nov. 25, 1958

2,861,707

SUSPENSION FOR FLEXIBLE CLOSURE

Edward W. Moorman, Dayton, Ohio, assignor to The Dayton Rubber Company, a corporation of Ohio Application June 27, 1955, Serial No. 518,125

1 Claim. (Cl. 220—15)

The present invention relates to a method and apparatus for supporting flexible closures such as rubber-like bladder cells for fuel or the like and particularly for supporting such cells in a manner which will cause them to substantially occupy vehicular compartments which are defined by rigid members.

In providing fuel containers for aircraft, ground vehicles or the like where weight and space requirements are strict and the complete imperviousness of the container is of great importance, it has become the practice to employ a flexible container of rubber-like material which is so constructed as to conform to the general shape and volume of compartments normally present in the vehicle's construction such as the space between the supporting ribs of a wing structure, the unused space in a fuselage immediately forward of the tail section and the like. Where these flexible containers are thus made to conform substantially to the contour of the compartment defined by the rigid walls thereof, the collapsibility of the container is relatively unobjectionable in view of the fact that the rigid support necessary for the containers is provided by the rigid surrounding walls. Viewed in another light, it might be said that the collapsible containers so employed are merely bladders or liners for the compartments which are themselves, in a sense, the fuel containers, such containers being made impervious and leakproof by the presence therein of the bladder or liner. For this reason, such flexible containers are sometimes referred to as "bladder cells."

If these bladder cells or liners are placed only loosely in the compartments for which they are designed, they will collapse unless they are in some way fastened to the rigid walls of the surrounding compartment. Although, upon the filling of such a liner with aircraft fuel, for example, the bladder will expand to fill its intended cavity, it often happens that the bladder, as the fuel is placed therein, will expand abnormally and cause creases or wrinkles to become fixed in the liner preventing it from expanding to its full capacity. In addition to this undesirable feature, it is obvious that the bladder cell cannot be maintained at capacity fuel level particularly when the vehicle is being operated and is consuming the fuel. If the fuel is thus removed from a bladder cell which is unassociated with the surrounding rigid walls, it follows that the cell will collapse as the fuel is depleted. As the flexible container thus leaves the rigid supporting wall, it becomes subject to jostling in the compartment and is thus made susceptible to abrasion and impact loads which will result in its early failure and the loss of its necessary imperviousness.

In view of the obvious disadvantages attending the use of a bladder cell which is not in some way affixed to the rigid walls of the aircraft compartment for which it is designed, it has become the practice to support the bladder cell in some manner wherever possible. The logical expedient has been to employ a suitable adhesive such as a rubber-to-metal adhesive capable of setting up at room temperatures or upon the release of the solvent therein. In view however of the impact loads attending the sloshing of the fuel during the maneuvering, landing and taking off of an aircraft for example, and in view of the flexing of the relatively rigid surrounding structure itself, it has been found that a sufficiently strong adhesive is difficult to obtain. Furthermore, where such an adhesive has been found, it has been the rule that the same will be effective only if it is applied over a substantial surface of the bladder cell such that practically the entire surface thereof is cemented to the surrounding rigid members. While this has proven satisfactory to a certain extent, it has resulted that in the event the bladder cell forms a leak or for other reasons becomes unsatisfactory for use, its removal from the aircraft compartment is extremely difficult and as a matter of fact is practically impossible without completely destroying the cell.

It is accordingly an object of the present invention to provide a particularly strong means for suspending a flexible container within a closely fitting compartment defined by relatively rigid members.

It is an object of the present invention to provide such a suspension which is capable of rendering the flexible closure easily removable and at the same time capable of withstanding impact loads and flexing without yielding thereto.

It is a further object of the present invention to provide such a suspension which, in addition to rendering the closure readily removable and capable of withstanding the stresses of a shifting fluid therein, is protected against abrasive wear which results from the rubbing of the flexible closure against the rigid confines thereof.

It is a more specific object of the present invention to provide a suspension means for bladder cells employed in aircraft by which a bladder cell may be easily installed and removed and by which such a cell will be protected from wear and premature deterioration resulting from the dynamic stresses of the fluid in motion therewithin and the abrasion of the cell against the rigid confines of the compartment in which it is placed.

To achieve these and other obvious objects and advantages of the present invention which will be apparent from a reading of the following disclosure, it is proposed to provide a flexible suspension means comprising two series of straps or slots and a tape threadably cooperable therewith, wherein one of the series is adapted to be affixed to a rigid member of the compartment surrounding the flexible closure and the other is adapted to be affixed to the wall of the flexible closure itself. The tape is then designed to be threaded through these respective straps or slots in a manner which will draw the flexible walled closure against the surrounding rigid compartment and there hold the same in place subject however to being easily separated by a loosening of the tape. More specifically, this invention provides for strips to be affixed respectively to the aircraft structure and the flexible closure, the strips being preferably of a woven fabric which will resist the chafing or abrading action of the flexible closure's rubbing against the rigid walls surrounding the same. These fabric strips are provided with transversely extending slits or incisions arranged in pairs, such slits terminating short of the edges of said strips and providing transversely extending straps or loops therein likewise terminating short of the edges of said strips through which straps or loops the tape, likewise composed of a fabric or similar flexible material, may be threaded. In order to accomplish a satisfactory threading, it is of course desirable that the chafing strip should be so positioned that the transversely extending straps of one of the same are spaced between such straps in the other. In order to provide an effective threading or lacing of the tape, it is further provided that the flexible tape should be anchored at each of its ends, for example, by adhering the same to the compartment, the closure itself or to the chafing strips affixed to either of these components.

In view of the improved adhesion which may be obtained between strips of the nature of the chafing strip here employed and the metal structure of the surrounding compartment, it is not necessary that chafing strips should cover the entire surface of the flexible closure and, as a matter of fact, these strips may be provided only at such points as are found necessary to support the bladder cell in a manner which will prevent its collapsing or forming pockets between the cell wall and the surrounding compartment in which explosive vapors and the like might become trapped. In view of the ease with which the flexible tape may be threaded through the straps provided in the chafing strips, it of course follows that the installation and removal of the cell in the event its replacement should become necessary may be easily effected. Notwithstanding the ease of this replacement, the versatility of the tape as it cooperates with the transversely slit chafing strips in such that the bladder cell may be drawn tightly against the rigid walls of the surrounding aircraft compartment, and the full effect of the rigid support of the surrounding walls may be made available in supporting the load of the fuel within the cell.

The invention thus generally described may be more clearly understood from the following detailed description in connection with which reference may be had to the appended drawings.

Figure 1:
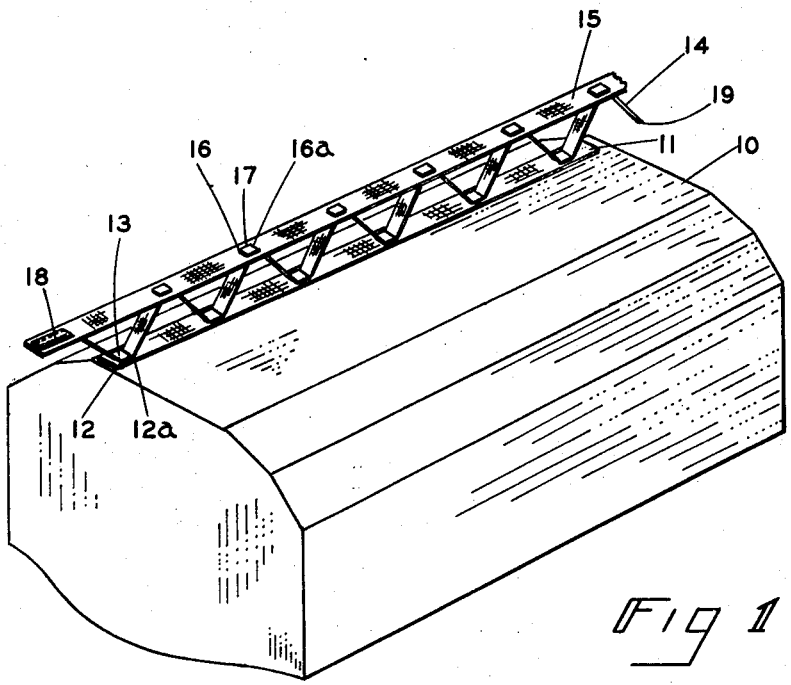
Figure 1 is a perspective of a conventional bladder cell for carrying aircraft fuel and a means for suspending the same from the rigid members of the surrounding compartment.

Referring now to Figure 1, the numeral 10 designates generally a flexible walled closure of the type normally employed as bladder cells for lining aircraft fuel compartments. The peculiar shape of this cell may be varied of course depending upon the particular shape of the compartment of the aircraft in which the bladder cell is to be contained. The cell 10 shown in Figure 1, for example, might be such as is designed to be included in the rear fuselage portion of an aircraft immediately preceding the tail section thereof which space, particularly in the case of smaller aircraft, is of little or no usefulness except for transporting fuel. As explained above, it is desirable that this fuel cell should be so designed that when it is completely filled out either with fuel or other substances, it should substantially completely occupy the intended compartment such that all of the bladder cell walls will be in substantial contiguity with the more rigid walls of the surrounding compartment.

Adhered to the bladder cell thus constructed, is a fabric strip 11 having slots or incisions 12 and 12a extending transversely thereof and terminating short of the edges thereof. This strip is preferably of a flexible material so that it may flex with the walls of the closure and also with the relatively rigid walls of the aircraft so as to take up the shock loading of the impact resulting as a fuel for example is sloshed about within the container. It will be noted that the transverse slits or incisions are preferably provided in pairs such as 12 and 12a which pairs are spaced longitudinally of the strip. Where the slits are so provided it is apparent that a strap 13 is left between each pair of incisions and it is through these straps that the tape 14 is to be threaded. In order to facilitate the threading of the tape 14 through the slits, it has been found preferable that the strip 11 be adhered to the flexible walled container only at those points lying between the straps. When such adhesion is present it is a relatively simple matter to pull the straps 13 away from the cell to allow for the passing of the tape 14 therethrough. At the same time in view of the improved adhesion which may be obtained between the fabric or similar materials of which the strip 11 is composed, it is not necessary that the complete area of the same be provided with an adhesive in order to satisfactorily hold the load.

Any flexible material is suitable for the strip 11 but as explained above, it is preferable that this strip should have properties rendering it capable of withstanding prolonged abrasion such as is apt to take place when the flexible bladder cell rubs against the walls of the surrounding compartment. In order to improve the adhesion of such a strip to the bladder cell which is usually composed primarily of a fuel-resistant rubber or a rubber-like composition including the various well-known synthetic rubber-like materials such as butadiene-acrylic nitrile and the polychloroprenes, the polysulfide rubbers or other plastic materials such as nylon, polyethylene or the like having similar flexible, elastic or elastomeric properties, it may be found desirable to provide the fabric with a thin coating of rubber or other material at least on that side to be adhered to the cell, such coating permitting bonding of the fabric to the container.

The strip 15 to be adhered to the rigid supporting wall of the surrounding compartment is likewise composed of a special material, preferably one that can withstand abrasion, and a heavy woven fabric such as a cotton duck has been found suitable for this purpose. Once again, in order to facilitate the adhesion of the strip, this time to the rigid surrounding compartment wall, this strip 15 may be provided with a rubber friction or skim coating or other suitable adhesives.

Once again it will be observed that the strip 15 is provided with transverse slits 16 and 16a which are arranged in pairs to provide transversely extending straps 17 through which the tape 14 may likewise be threaded. Once again as in the case of the straps 13 it is preferred that this strip 15 be adhered to the rigid surrounding structure at points between straps 17 so that the straps may be easily pulled out to receive the tape 14.

The tape 14 is similarly composed of a flexible material and a broad range of materials may be successfully employed. The flexibility of the tape is necessary in order to provide for its being properly threaded through the other strips and it has been found that a certain amount of stretchability in this tape will serve as a shock absorber to cushion the impact loads of the fuel sloshing about in the flexible walled container. In keeping with these preferred properties a tape composed of nylon has been found particularly satisfactory. In order for this tape to be effective in supporting the flexible closure, however, it is necessary that the tape itself be anchored at its ends. In order to accomplish this anchoring and at the same time not to subtract from the ease of replacing the bladder cell, it is the preferred practice to anchor the tape 14 at its one end 18 by sewing, stitching, cementing or otherwise adhering the same to one end of one of the chafer strips preferably the one positioned upwardly of the two, which in the case of Figure 1 is designated by the number 15. From its anchored position on the strip and incidentally therethrough to the surrounding structure for the flexible walled cell the tape is threaded alternately through the straps in the strips 11 and 15, the strips being so spaced that the respective straps thereof are spaced in staggered relation. The tape is therefore made to pass from that strip to which it is anchored through the first strap in the opposite strip and then alternately back to a slot in the previous strip and so on until all of the straps have been occupied by the tape whereupon the tape may be drawn tightly to bring the flexible walls of the bladder cell into close contact with the surrounding supporting structure whereupon the previously free end 19 of the tape may be adhered to one of the strips 11 or 15, to the fuel cell itself, or to the surrounding compartment therefor.

Figure 2:
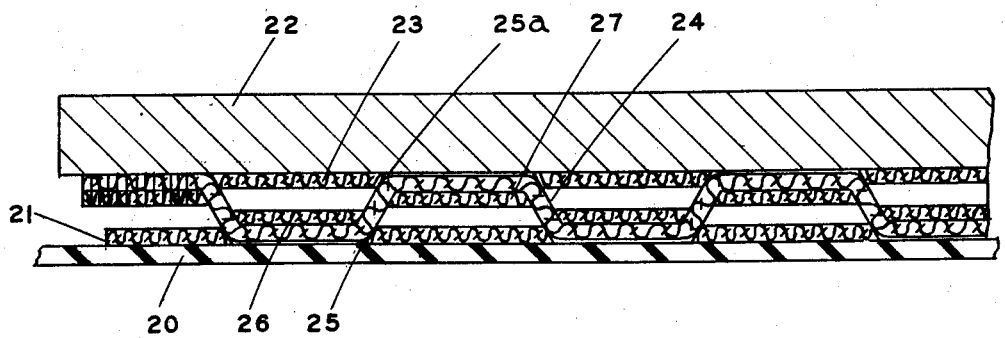
Figure 2 is an enlarged cross section longitudinally of the tape and chafing strip of a suspension similar to that shown in Figure 1, the bladder cell being drawn into close contact with the surrounding rigid wall.

The appearance of the suspension when it is thus fixed in its final form is best shown in Figure 2 wherein 20 represents the flexible fuel cell wall, 21 is the chafing strip adhered thereto, 22 represents the surrounding rigid supporting structure, 23 represents the chafing strip adhered thereto, and 24 represents the nylon tape passing through the slits 25 and 25a provided in the strips 21 and 23, respectively. As in the case of the construction of Figure 1, the tape is affixed by stitching to the upper chafing strip 23 and as it is drawn tight, in view of the staggered relationship of the straps 26 and 27 of the strips 21 and 23, respectively, the tape assumes a serpentine pattern wherein alternate segments thereof are in contact with the surrounding rigid wall and the intermediate segments thereof are in contact with the flexible walled container.

A closer inspection of Figure 2 will reveal that in this installation the bladder cell is held in close contact with the surrounding structure but at the same time there is a certain amount of movement allowed to absorb the impact of the fluid moving within the flexible walled container. At the same time the chafing strips 21 and 23 protect the flexible walled container from the wearing effects of the abrasion which will result when this nominal amount of cushioning movement takes place between the flexible cell and the surrounding compartment.

While the present invention provides improvements particularly adaptable for use in aircraft and similar airborne vehicles because of the savings in weight and the utilization of otherwise unusable space made possible, it is to be understood that the features herein may be advantageously employed in ground vehicles as well or in any liquid containing installation having similar requirements. It should be further understood that the particularization herein has been for purposes of illustration only and is in no way intended to limit the scope of the present invention as it is defined in the subjoined claim.

I claim:

In a fuel cell construction comprising a flexible walled container removably positioned in a supporting structure, the combination with said container and said supporting structure of a first longitudinally extending elongated tape member having longitudinally spaced pairs of transverse slits formed therein, each pair of slits thereby forming a loop, said tape being bonded to the inner surface of the upper portion of said supporting structure between loops, a second longitudinally extending elongated tape member affixed to the upper surface of said flexible container, said second tape member being formed with longitudinally spaced pairs of transverse slits each pair forming a loop, said second tape member being bonded to said container between said loops and positioned with respect to said container in coextensive alignment with said first tape member, a tightly drawn tape threaded through said loops alternately of said first and second tapes longitudinally thereof, and means for maintaining said last-named tape in a tightly drawn position.

References Cited in the file of this patent

UNITED STATES PATENTS

| 1,642,005 | Arnstein | Sept. 13, 1927 |
| 1,802,046 | Bower | Apr. 21, 1931 |
| 2,579,183 | Freyssinet | Dec. 18, 1951 |

FOREIGN PATENTS

| 626,443 | Great Britain | July 14, 1949 |
| 626,444 | Great Britain | July 14, 1949 |